(12) United States Patent
Tezuka et al.

(10) Patent No.: US 9,886,020 B2
(45) Date of Patent: Feb. 6, 2018

(54) NUMERICAL CONTROL DEVICE OF MACHINE TOOL

(71) Applicant: FANUC Corporation, Yamanashi (JP)

(72) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 339 days.

(21) Appl. No.: 14/602,833

(22) Filed: Jan. 22, 2015

(65) Prior Publication Data

US 2015/0205282 A1    Jul. 23, 2015

(30) Foreign Application Priority Data

Jan. 23, 2014    (JP) .................................. 2014-010468

(51) Int. Cl.
*G05B 19/18*    (2006.01)
*G06F 17/10*    (2006.01)
*G05B 19/416*    (2006.01)

(52) U.S. Cl.
CPC .......... *G05B 19/182* (2013.01); *G05B 19/416* (2013.01); *G06F 17/10* (2013.01);
(Continued)

(58) Field of Classification Search
CPC ........ G05B 19/416; G05B 2219/45216; G05B 2219/34314; G05B 19/408; G05B 2219/37252; G05B 2219/43006
See application file for complete search history.

(56) References Cited

U.S. PATENT DOCUMENTS 4,941,104 A * 7/1990 Teshima ............... G05B 19/186
                                                         318/567
4,985,841 A * 1/1991 Iwagaya .................. B23G 1/16
                                                           408/11
(Continued)

FOREIGN PATENT DOCUMENTS

DE    19700853 A1    3/1998
DE    19905775 A1    8/2000
(Continued)

OTHER PUBLICATIONS

Office Action in DE Application No. 102015000586.3, dated May 19, 2017.
(Continued)

*Primary Examiner* — Darrin Dunn
(74) *Attorney, Agent, or Firm* — Hauptman Ham, LLP

(57) ABSTRACT

A numerical control device comprising an acceleration/deceleration characteristic acquisition part which acquires predetermined acceleration/deceleration characteristic information showing a correspondence between a command speed and a maximum acceleration of a spindle, a rotation amount acquisition part which acquires predetermined rotation amount information showing the rotation amount of the spindle for a period from when feed operation of the spindle is started to when a tapping tool reaches a bottom of the hole of a workpiece, a machining time calculation part which calculates a correspondence between the command speed and a machining time required to reach the rotation amount, based on the acceleration/deceleration characteristic information and the rotation amount information, and a speed determination part which determines an optimum value of the command speed for minimizing the machining time, based on the correspondence calculated by the machining time calculation part.

7 Claims, 7 Drawing Sheets

(52) U.S. Cl.
CPC .............. *G05B 2219/45216* (2013.01); *G05B 2219/50216* (2013.01); *Y02P 90/265* (2015.11)

(56) References Cited

U.S. PATENT DOCUMENTS

| | | | | |
|---|---|---|---|---|
| 5,485,065 | A * | 1/1996 | Kaneko | G05B 19/416 318/270 |
| 5,517,639 | A * | 5/1996 | Yamaguchi | G06F 11/3466 377/16 |
| 6,008,609 | A * | 12/1999 | Sawashima | G05B 19/186 318/569 |
| 6,111,382 | A * | 8/2000 | Tsutsui | G05B 19/186 318/569 |
| 6,678,636 | B1 * | 1/2004 | Coleman | G06F 11/0736 702/182 |
| 7,933,679 | B1 * | 4/2011 | Kulkarni | G05B 13/0265 700/173 |
| 2001/0015116 | A1 * | 8/2001 | Kakino | B23G 1/16 82/1.11 |
| 2001/0029404 | A1 * | 10/2001 | Sugiyama | G05B 19/414 700/160 |
| 2004/0167659 | A1 * | 8/2004 | Scherer | G05B 19/4163 700/173 |
| 2011/0169440 | A1 * | 7/2011 | Fujishima | G05B 19/416 318/561 |
| 2011/0288676 | A1 * | 11/2011 | Landgraf | G05B 19/4068 700/173 |
| 2013/0204427 | A1 * | 8/2013 | Terada | G05B 19/19 700/192 |
| 2015/0081084 | A1 * | 3/2015 | Nishiwaki | B23G 1/16 700/170 |
| 2016/0091886 | A1 * | 3/2016 | Sato | G05B 19/416 700/188 |
| 2016/0116909 | A1 * | 4/2016 | Morita | G05B 19/186 700/188 |

FOREIGN PATENT DOCUMENTS

| | | |
|---|---|---|
| DE | 102010063244 A1 | 7/2011 |
| DE | 102012104195 A1 | 11/2012 |
| JP | H03-117514 A | 5/1991 |
| JP | H03-117515 A | 5/1991 |
| JP | H06-289922 A | 10/1994 |
| JP | H07-251325 A | 10/1995 |
| JP | 2004-141991 A | 5/2004 |

OTHER PUBLICATIONS

Weck, Manfred, "Werkzeugmaschinen Fertigungssysteme 3—Mechatronische Systeme: Vorschubantriebe und Prozessdiagnose", 5th edition 2001 (VDI-Buch)., pp. 25-26, Springer, Berlin, Germany, for which an explanation of relevance is mentioned in the DE Office Action, dated May 19, 2017.

* cited by examiner

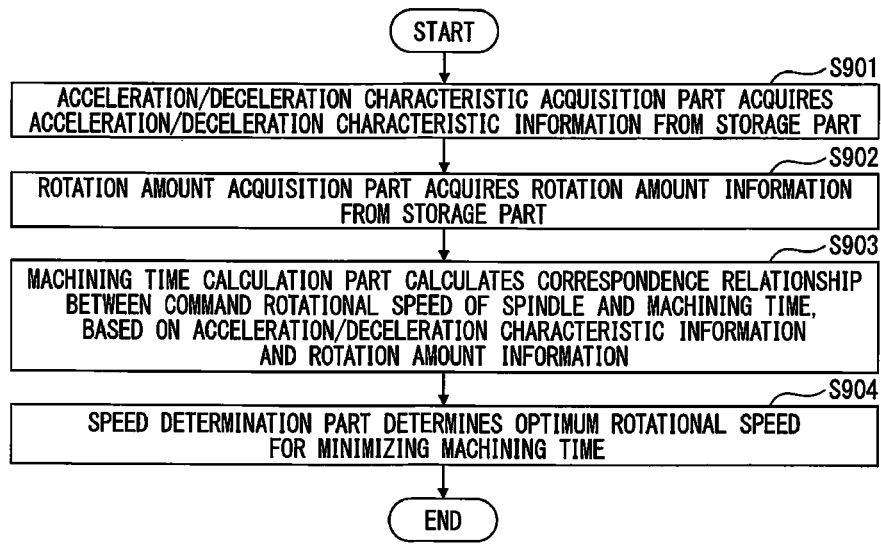
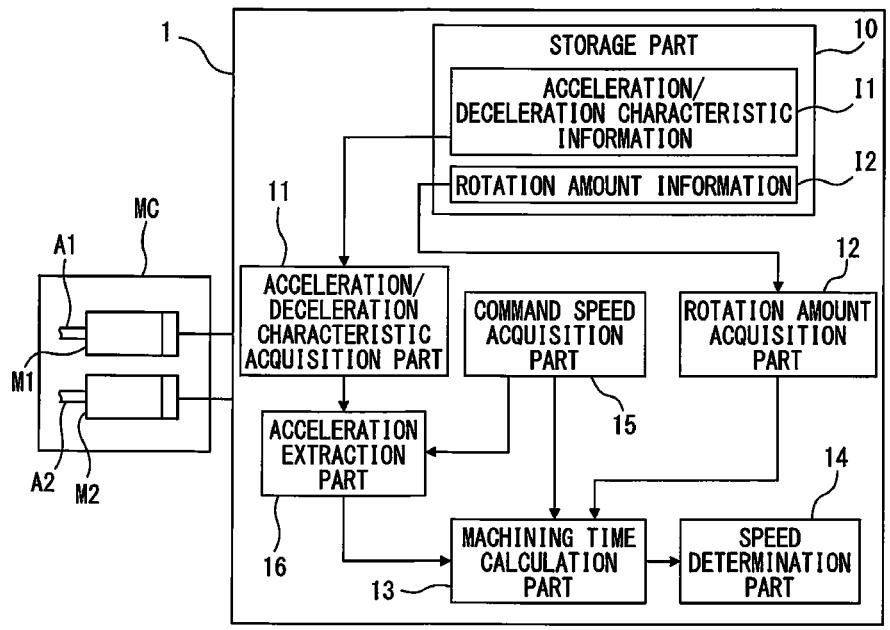

NUMERICAL CONTROL DEVICE OF MACHINE TOOL

RELATED APPLICATIONS

The present application claims priority to Japanese Application Number 2014-010468, filed Jan. 23, 2014, the disclosure of which is hereby incorporated by reference herein in its entirety.

BACKGROUND OF THE INVENTION

1. Field of the Invention

The present invention relates to a numerical control device of a machine tool for performing tapping process on a workpiece.

2. Description of the Related Art

When using a machine tool for performing a tapping process on a workpiece, it is necessary to precisely synchronize the spindle to which the tapping tool is attached and the feed shaft for feed operation of the spindle. Further, to shorten the cycle time of the tapping process, it is necessary to determine the rotational speed and acceleration etc. of the spindle so that the movement time of the spindle by the feed shaft is minimized for a predetermined rotation amount of the spindle. However, accurate determination of these parameters largely depends on the ability and experience of skilled operators, so has been difficult task for most operators.

In relation to this, JP-A-H3-117515 discloses the art of calculating an acceleration/deceleration time constant T for minimizing the machining time, based on a cutting depth "l" and thread pitch P during tapping process. More specifically, the art of JP-A-H3-117515 calculates the acceleration/deceleration time constant T, using a relational expression: $S=l/P=\alpha T^2$ which is established among a rotation amount $S(S=l/P)$ of the spindle, acceleration $\alpha$ of the spindle, and an acceleration/deceleration time constant T. However, the art of JP-A-H3-117515 is intended to calculate the suitable acceleration/deceleration time constant for a predetermined rotational speed of the spindle, and it cannot be used to determine the rotational speed of the spindle for minimizing the machining time. Further, the art of JP-A-H3-117515 envisions only the situation where a spindle starts to decelerate immediately after acceleration up to a command rotational speed, so cannot necessarily calculate the optimal acceleration/deceleration time constant for all situations.

A numerical control device which can determine the command rotational speed of the spindle for minimizing the machining time during tapping process has been sought.

SUMMARY OF INVENTION

According to a first aspect of the present invention, there is provided a numerical control device of a machine tool which performs tapping process on a workpiece, using a spindle to which a tapping tool is attached, and a feed shaft for feed operation of the spindle, comprising: an acceleration/deceleration characteristic acquisition part which acquires predetermined acceleration/deceleration characteristic information showing a correspondence between a command rotational speed of the spindle and a maximum possible acceleration of the spindle, a rotation amount acquisition part which acquires predetermined rotation amount information showing the rotation amount of the spindle for a period from when the feed operation of the spindle is started to when the tapping tool reaches a bottom of the hole of the workpiece, a machining time calculation part which calculates a correspondence between the command rotational speed of the spindle and a machining time required for the spindle to reach the rotation amount, based on the acceleration/deceleration characteristic information and the rotation amount information, and a speed determination part which determines an optimum value of the command rotational speed of the spindle for minimizing the machining time, based on the correspondence calculated by the machining time calculation part.

According to a second aspect of the present invention, there is provided the numerical control device in the first aspect, further comprising a command speed acquisition part which acquires a plurality of selection values of the command rotational speed of the spindle, wherein the machining time calculation part calculates a correspondence between each of the plurality of selection values and the machining time, and the speed determination part determines an optimum value of the command rotational speed of the spindle from among the plurality of selection values.

According to a third aspect of the present invention, there is provided the numerical control device in the first or second aspect, wherein the machining time calculation part uses the following numerical formula (1) to calculate the correspondence between the command rotational speed of the spindle and the machining time:

$$T(v) = \frac{v}{a(v)} + \frac{D}{v} \qquad (1)$$

where:
"v" is the command rotational speed of the spindle,
"a(v)" is the maximum possible acceleration,
"D" is the rotation amount, and
"T(v)" is the machining time.

According to a fourth aspect of the present invention, there is provided the numerical control device in any one of the first to third aspects, further comprising an acceleration/deceleration characteristic correction part which corrects the maximum possible acceleration in the acceleration/deceleration characteristic information in light of a drop in torque of the spindle caused by a load during the tapping process, wherein the machining time calculation part calculates the correspondence between the command rotational speed of the spindle and the machining time, based on the acceleration/deceleration characteristic information after correction by the acceleration/deceleration characteristic correction part.

According to a fifth aspect of the present invention, there is provided the numerical control device in any one of the first to fourth aspects, further comprising a display part which displays the correspondence between the command rotational speed of the spindle and the machining time calculated by the machining time calculation part.

According to a sixth aspect of the present invention, there is provided the numerical control device in the fifth aspect, wherein the rotation amount acquisition part acquires plural pieces of rotation amount information which show a plurality of rotation amounts, the machining time calculation part calculates a correspondence between the command rotational speed of the spindle and the machining time, based on each of the plural pieces of rotation amount information, and the display part displays the correspondence between the command rotational speed of the spindle and the machining time for each of the plurality of rotation amounts.

According to a seventh aspect of the present invention, there is provided the numerical control device in the fifth or sixth aspect, wherein the acceleration/deceleration characteristic acquisition part acquires the acceleration/deceleration characteristic information defined for each of plural spindles, the machining time calculation part calculates a correspondence between the command rotational speed of a spindle and the machining time, based on each of the plural pieces of acceleration/deceleration characteristic information, and the display part displays a correspondence between the command rotational speed of the spindle and the machining time for each of the plural spindles.

These and other objects, features, and advantages of the present invention will become clearer with reference to the detailed description of illustrative embodiments of the present invention which are shown in the attached drawings.

BRIEF DESCRIPTION OF DRAWINGS

FIG. 9 is a flow chart which shows processing steps where the numerical control device shown in FIG. 1 determines an optimum rotational speed of the spindle.

FIG. 10 is a block diagram which shows the configuration of a machining system including another illustrative numerical control device according to the present embodiment.

DESCRIPTION OF EMBODIMENTS

Below, embodiments of the present invention will be explained in detail with reference to the drawings. Note that, the following description does not limit the technical range and meanings of the terms of the invention which are described in the claims.

Figure 1:
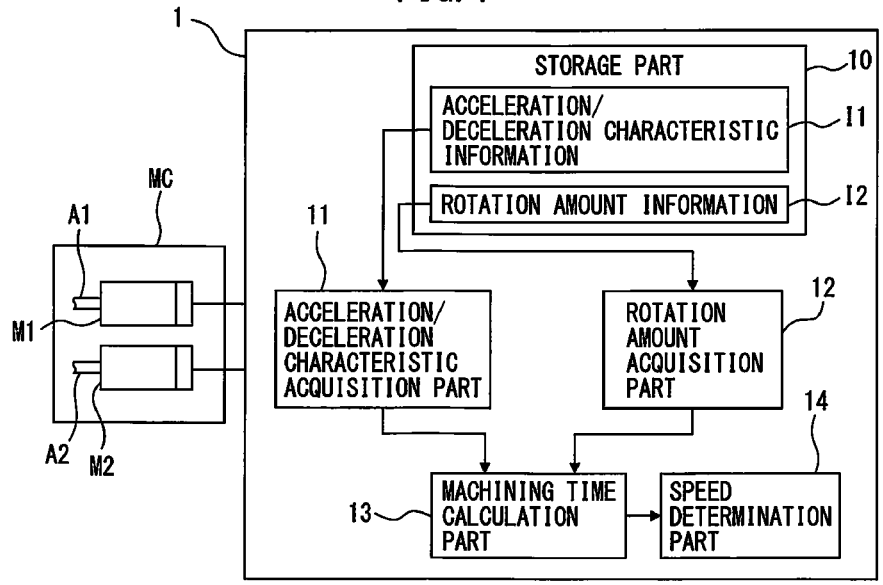
FIG. 1 is a block diagram of the configuration of a machining system including an illustrative numerical control device according to a first embodiment of the present invention.

Referring to FIG. 1 to FIG. 10, a numerical control device of a machine tool according to a first embodiment of the present invention will be explained. FIG. 1 is a block diagram which shows a configuration of a machining system which is provided with an illustrative numerical control device 1 according to the present embodiment. The numerical control device 1 of the present embodiment is a numerical control device which numerically controls a machine tool MC for performing tapping process on a workpiece. As shown in FIG. 1, the machine tool MC of the present example comprises a spindle A1 to which a tapping tool is attached, a feed shaft A2 which performs a feed operation of the spindle A1, a spindle motor M1 which rotates the spindle A1, and a feed axis motor M2 which rotates the feed shaft A2. Further, the numerical control device 1 is designed to synchronously control the spindle motor M1 and feed axis motor M2 so that the machine tool MC performs tapping process on the workpiece.

Figure 2:
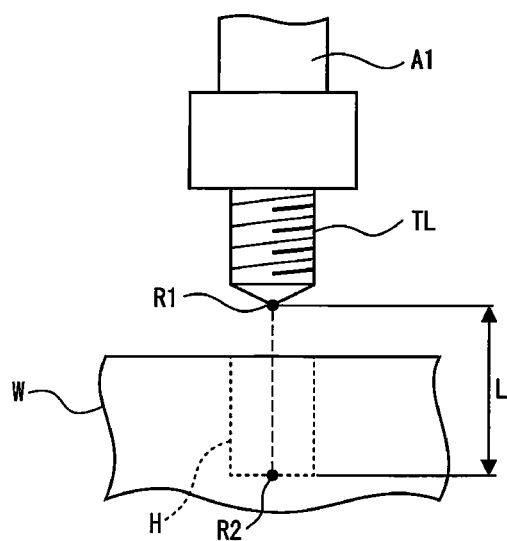
FIG. 2 is a view for explaining the tapping process on a workpiece by the machining system of FIG. 1.

Here, referring to FIG. 2, the tapping process on a workpiece by the machining system of FIG. 1 will be explained. FIG. 2 is a side view which schematically shows the vicinity of a tapping tool TL which is attached to a spindle A1 of a machine tool MC. In the tapping process of the present example, first, the spindle A1 is positioned with respect to a hole H formed in the workpiece W. Due to this, as shown in FIG. 2, a front end part of the tapping tool TL is arranged at a machining start point R1 above the hole H. Next, the spindle motor M1 and feed axis motor M2 are synchronously controlled so that the tapping tool TL rotates while moving with respect to the workpiece W. Due to this, a threaded groove is successively formed in the inside circumferential wall of the hole H of the workpiece W. Further, after the front end part of the tapping tool TL reaches a machining end point R2 of the bottom of the hole of workpiece W, the front end part of the tapping tool TL is pulled back to the machining start point R1 again. At this time, the spindle motor M1 and the feed axis motor M2 are synchronously controlled so that the amount of movement "p" (mm/rev) by the feed shaft A2 per rotation of the spindle A1 becomes equal to a predetermined thread pitch. Further, the rotation amount D(rev) of the spindle A1 in the period from when the feed operation of the spindle A1 is started to when the tapping tool TL reaches the bottom of the hole of the workpiece can be calculated from the movement distance L and movement amount "p" (mm/rev) of the spindle A1, using the following formula (2):

$$D = \frac{L}{p} \qquad (2)$$

where:

"L" is the movement distance from the machining start point R1 to the machining end point R2 in FIG. 2 caused by the feed operation of the spindle A1.

The movement distance L and movement amount "p" of the spindle A1 can, for example, be acquired from the machining program.

Figure 3:
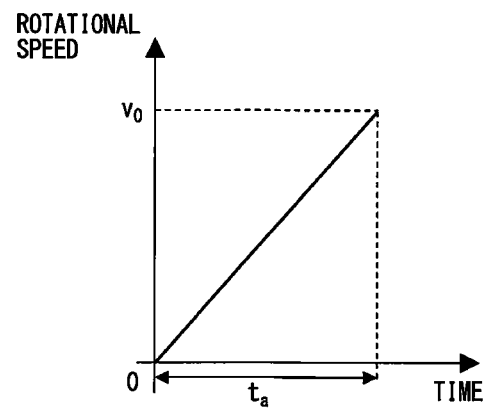
FIG. 3 is a graph which shows a temporal change in the rotational speed of a spindle of a machine tool in FIG. 1 in the period until the spindle reaches a command rotational speed.

Further, the command rotational speed of the spindle A1 in the period during which the tapping tool TL moves from the machining start point R1 to the machining end point R2 can for example be acquired from the machining program. FIG. 3 is a graph which shows a temporal change in the rotational speed of the spindle A1 in the period until the rotational speed of the spindle A1 of the machine tool MC in FIG. 1 reaches a predetermined command rotational speed $v_0$. As shown in FIG. 3, the rotational speed of the spindle A1 is controlled to increase with a constant acceleration until reaching the command rotational speed $v_0$. That is, the graph of FIG. 3 is a straight line having the acceleration of the spindle A1 as a gradient. The acceleration of the spindle A1 is determined by the two parameters: the command rotational speed $v_0$ of the spindle A1, and the time constant $t_a$ for the period until the rotational speed of the spindle A1 reaches the command rotational speed $v_0$. As explained below, the maximum possible acceleration of the spindle A1 can vary in accordance with the command rotational speed of the spindle A1 (see FIG. 5).

Figure 4:
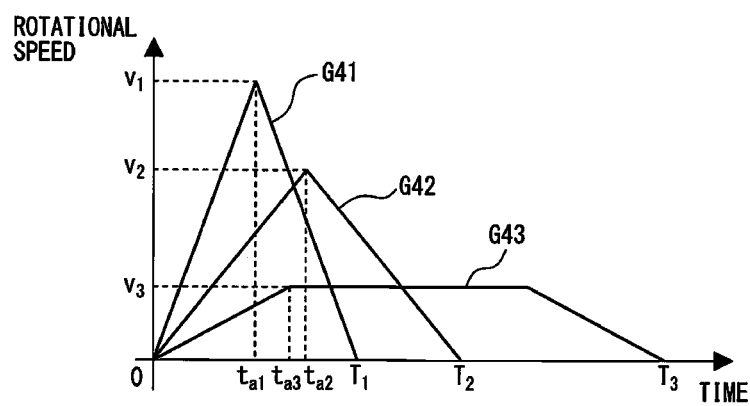
FIG. 4 is a first graph which shows a temporal change in the rotational speed of a spindle of a machine tool in FIG. 1 in the period until the spindle reaches a predetermined rotation amount.

FIG. 4 is a graph which shows a temporal change in the rotational speed of the spindle A1 in the period until the spindle A1 of the machine tool MC in FIG. 1 reaches a predetermined rotation amount D. FIG. 4 shows graphs G41, G42, and G43 which correspond to any three maximum accelerations $a_1$, $a_2$, and $a_3$ ($a_1 > a_2 > a_3$). The command rotational speeds "v" of the spindle A1 which correspond to the three graphs G41, G42, and G43 are $v_1$, $v_2$, and $v_3$ ($v_1 > v_2 > v_3$). The integration values of the three graphs G41, G42, and G43 which are calculated by time integration become equal to predetermined rotation amount D of the spindle A1. As will be understood from a comparison of the three graphs G41, G42, and G43, the larger the command rotational speed "v" and the maximum acceleration $a(=v/t_a)$ of the spindle A1, the shorter the time T which is required for the spindle A1 to reach the predetermined rotation amount D ($T_1 < T_2 < T_3$). The time T which is required for the spindle A1 to reach the predetermined rotation amount D will be referred to below as the "machining time T". However, in general, the output torque of a motor falls in the high speed rotation region, so the maximum possible acceleration "a" of the spindle A1 is limited in the high speed rotation region. It is therefore impossible to simultaneously increase the command rotational speed "v" and maximum acceleration "a" of the spindle A1. Consequently, in order to shorten the machining time T, it is preferable to determine the optimum command rotational speed "v" in light of the acceleration/deceleration characteristic for each rotational speed of the spindle A1. The acceleration/deceleration characteristic of the spindle A1 of the machine tool MC of the present example will be explained in detail below.

Figure 5:
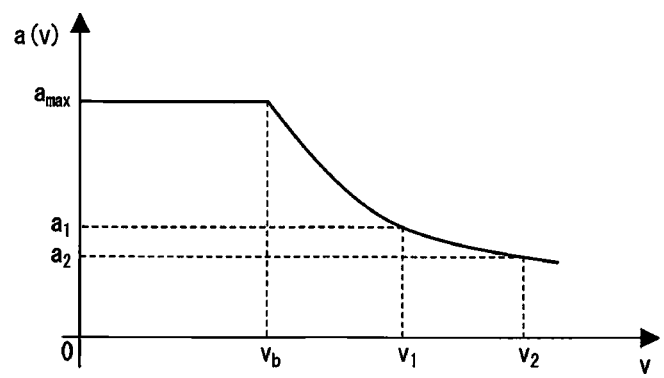
FIG. 5 is a graph which shows an acceleration/deceleration characteristic of a spindle of a machine tool in FIG. 1.

FIG. 5 is a graph which shows the acceleration/deceleration characteristic of the spindle A1 of the machine tool MC in FIG. 1. As shown in FIG. 5, the maximum acceleration "a" of the spindle A1 according to the present example is a constant value ($a = a_{max}$) regardless of the command rotational speed in the range where the command rotational speed "v" is less than a predetermined value $v_b$, but the command rotational speed "v" falls in inverse proportion to the command rotational speed "v" in the range where the command rotational speed "v" is greater than or equal to a predetermined value $v_b$. That is, the maximum acceleration "a" of the spindle A1 according to the present example is expressed by a function a(v) of the command rotational speed "v" using the following formula (3). In the graph of FIG. 5, the command rotational speed $v_b$ at which the maximum acceleration "a" starts to decrease may be referred to below as the "base rotational speed $v_b$".

$$a(v) = \begin{cases} a_{max} & (0 \le v < v_b) \\ \dfrac{a_{max}}{v} \cdot v_b & (v \ge v_b) \end{cases} \quad (3)$$

Figure 6:
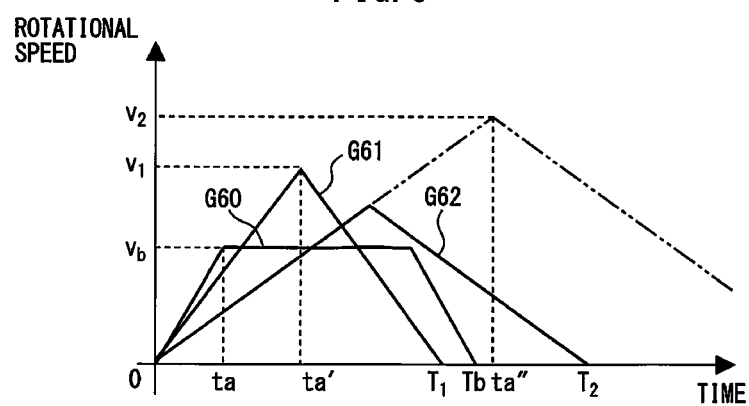
FIG. 6 is a second graph which shows the actual temporal change in the rotational speed of a spindle of a machine tool in FIG. 1 in the period until the spindle reaches a predetermined rotation amount.

FIG. 6 shows a temporal change in the rotational speed of the spindle A1 in the period until the spindle A1 of the machine tool MC in FIG. 1 reaches a predetermined rotation amount D, similar to FIG. 4. However, FIG. 4 shows a temporal change in the rotational speed which does not consider the acceleration/deceleration characteristic of the spindle A1, while FIG. 6 shows a temporal change in the rotational speed which considers the acceleration/deceleration characteristic of the spindle A1 according to the example of FIG. 5. More specifically, FIG. 6 shows graphs G60, G61, and G62 which correspond to the three command rotational speeds $v_b$, $v_1$, and $v_2$ ($v_b < v_1 < v_2$) in the graph of FIG. 5. In the same way as FIG. 4, the integration values of the three graphs G60, G61, and G62 which are calculated by time integration become equal to predetermined rotation amount D of the spindle A1. As will be understood from the graph of FIG. 5, the three command rotational speeds $v_b$, $v_1$, and $v_2$ correspond to the maximum accelerations $a_{max}$, $a_1$, and $a_2$ ($a_{max} > a_1 > a_2$). Further, as will be understood from the machining times $T_b$, $T_1$, and $T_2$ which correspond to the three graphs G60, G61, and G62, in the case where the maximum acceleration "a" of the spindle A1 decreases at the high speed rotation region, even if the command rotational speed "v" of the spindle A1 is increased, the machining time T is not necessarily shortened ($T_2 > T_b > T_1$). In particular, in the graph G62 corresponding to the maximum acceleration $a_2$, the rotational speed of the spindle A1 starts to decrease before reaching the command rotational speed $v_2$, so the machining time T becomes relatively long. For this reason, the numerical control device 1 of the present embodiment has the function of determining the optimal command rotational speed "v" of the spindle A1 for minimizing the machining time T, in light of the acceleration/deceleration characteristic of the spindle A1 as shown in FIG. 5.

Referring again to FIG. 1, the configuration of the numerical control device 1 of the present embodiment will be explained. As shown in FIG. 1, the numerical control device 1 of the present example comprises a storage part 10, acceleration/deceleration characteristic acquisition part 11, rotation amount acquisition part 12, machining time calculation part 13, and speed determination part 14. The functions of these component elements will be explained in detail below: The acceleration/deceleration characteristic acquisition part 11 of the present example has the function of acquiring a predetermined acceleration/deceleration characteristic information I1 which shows the correspondence between the command rotational speed "v" and the maximum possible acceleration "a" of the spindle A1. One example of the correspondence which is shown by the acceleration/deceleration characteristic information I1 of the present example is shown in the graph of FIG. 5. The acceleration/deceleration characteristic information I1 can, for example, be prepared in advance based on the specification value or actually measured value of the output characteristic of the spindle motor M1, and can be stored in advance in the storage part 10. The rotation amount acquisition part 12 of the present example has the function of acquiring predetermined rotation amount information I2 which shows the rotation amount D of the spindle A1 in the period from when the feed operation of the spindle A1 is started to when the tapping tool TL reaches the bottom of hole of the workpiece W. The rotation amount information I2 is, for example, calculated based on the movement distance L and movement amount "p" of the spindle A1, and can be stored in the storage part 10 (see the above formula (2)).

Next, the machining time calculation part 13 of the numerical control device 1 of the present example will be explained. The machining time calculation part 13 of the present example has the function of calculating the correspondence between the command rotational speed "v" of the spindle A1 and the machining time T which is required for the spindle A1 to achieve a predetermined rotation amount D, based on the above-mentioned acceleration/deceleration characteristic information I1 and rotation amount information I2. More specifically, the machining time calculation part 13 calculates the correspondence between the command rotational speed "v" and the machining time T, by means of the function T(v) of the machining time T which uses the command rotational speed "v" as a variable. This point will be explained in detail below. Note that, in the tapping process of this example, the spindle A1 is accelerated or decelerated linearly with the maximum possible acceleration, as shown in FIG. 6.

First, the machining time calculation part 13 obtains the possible range to be taken by the command rotational speed "v" when a predetermined rotation amount D of the spindle A1 and acceleration/deceleration characteristic such as shown in FIG. 5 are given, i.e., the domain of definition of the function T(v) ($0 \leq v \leq v_{max}$). More specifically, the machining time calculation part 13 calculates the command rotational speed "v" which is given when the rotation amount Da matches a predetermined value D during acceleration or deceleration of the spindle A1, as the upper limit value $v_{max}$ of the domain of definition of the function T(v). The rotation amount Da during acceleration or deceleration of the spindle A1 is expressed by the following formula (4).

$$Da = \frac{v}{a(v)} \times v = ta \times v \qquad (4)$$

where:

"ta" is the acceleration/deceleration time constant of the spindle A1.

Here, referring again to FIG. 6, it will be understood that the graph showing the temporal change in the rotational speed of the spindle A1 is transformed as follows depending on magnitude correlation between the rotation amount Da calculated from the above formula (4) and a predetermined rotation amount D of the spindle A1:

Case where Da<D: The spindle A1 is accelerated up to the command rotational speed "v", rotated at a constant speed at the command rotational speed "v", and then decelerated. Therefore, the graph of the temporal change in this case has a trapezoidal shape such as the graph G60 of FIG. 6.

Case where Da=D: The spindle A1 is accelerated up to the command rotational speed "v", and then decelerated without being rotated at a constant speed. Therefore, the graph of the temporal change in this case has a triangular shape such as the graph G61 of FIG. 6.

Case where Da>D: The maximum acceleration "a" of the spindle A1 is smaller (i.e., the gradient during acceleration is smaller) compared with the case where Da=D, so the spindle A1 starts to be decelerated before being accelerated up to the command rotational speed "v". Therefore, the graph of the temporal change in this case has a triangular shape such as the graph G62 of FIG. 6 which has a relatively long bottom side.

As explained above, in the case where Da>D, the spindle A1 starts to be decelerated before being accelerated up to the command rotational speed "v", so the machining time T in the case where Da>D (for example, the machining time $T_2$ corresponding to the graph G62 of FIG. 6) never becomes shorter than the machining time T in the case where Da=D (for example, the machining time $T_1$ corresponding to the graph G61 of FIG. 6). Therefore, the machining time calculation part 13 calculates the command rotational speed "v" of the spindle A1 in the case where Da=D, as the upper limit value $v_{max}$ in the domain of definition of the function T(v). Due to this, the command rotational speed "v" of the spindle A1 in the case where Da>D is excluded from the domain of definition of the function T(v). Further, when Da=D, the following formula (7) is derived from the above formula (4) and the following formulae (5) (6), so the upper limit $v_{max}$ of the domain of definition of the function T(v) is expressed by the following formula (8).

$$t_a = \frac{v_{max}}{a(v_{max})} \qquad (5)$$

$$a(v_{max}) = a_{max} \times \frac{v_b}{v_{max}} \qquad (6)$$

$$D = v_{max} \times t_a = \frac{v_{max}^2}{a(v_{max})} = \frac{v_{max}^3}{a_{max} \times v_b} \qquad (7)$$

$$v_{max} = \sqrt[3]{a_{max} \cdot v_b \cdot D} \qquad (8)$$

Next, the machining time calculation part 13 calculates the correspondence between the command rotational speed "v" and the machining time T of the spindle A1, according to the following procedure. First, the machining time calculation part 13 calculates the time which is required for acceleration and deceleration of the spindle A1. The calculated time is referred to as "acceleration/deceleration time Ta". More specifically, the time required for the acceleration and deceleration of the spindle A1 is v/a(v) each, so the acceleration/deceleration time Ta of the spindle A1 is expressed by the following formula (9).

$$Ta = \frac{2v}{a(v)} \qquad (9)$$

Next, the machining time calculation part 13 calculates the time period over which the spindle A1 rotates at a constant speed at the command rotational speed "v". The calculated time period is referred to as "constant speed rotation time Tb". More specifically, the rotation amount in the period where the spindle A1 rotates at a constant speed is calculated by D-Da, and Da is expressed by the above formula (4), so the constant speed rotation time Tb of the spindle A1 is expressed by the following formula (10).

$$Tb = \left(D - \frac{v}{a(v)} \times v\right) \div v = \frac{D}{v} - \frac{v}{a(v)} \qquad (10)$$

Next, the machining time calculation part 13 calculates the machining time T by adding the acceleration/deceleration time Ta and the constant speed rotation time Tb of the spindle A1. More specifically, the acceleration/deceleration time Ta and the constant speed rotation time Tb of the spindle A1 are respectively expressed by the above formulae (9) and (10), so the machining time T is expressed by the following formula (11). That is, the machining time calculation part 13 calculates the correspondence between the command rotational speed "v" of the spindle A1 and the machining time T, by means of the function T(v) of the machining time T which uses the command rotational speed "v" of the spindle A1 as a variable.

$$T(v) = Ta + Tb = \frac{2v}{a(v)} + \frac{D}{v} - \frac{v}{a(v)} = \frac{v}{a(v)} + \frac{D}{v} \quad (11)$$

Further, if the acceleration/deceleration characteristic of the spindle A1 is expressed by the above formula (3), the function T(v) is expressed by the following formula (12) in the range where $0 \leq v \leq v_{max}$ and $v < v_b$, and is expressed by the following formula (13) in the range where $0 \leq v \leq v_{max}$ and $v \geq v_b$.

$$T(v) = \frac{v}{a_{max}} + \frac{D}{v} \quad (0 \leq v \leq v_{max} \text{ and } v < v_b) \quad (12)$$

$$T(v) = \frac{v^2}{a_{max} v_b} + \frac{D}{v} \quad (0 \leq v \leq v_{max} \text{ and } v \geq v_b) \quad (13)$$

Next, the speed determination part 14 of the numerical control device 1 of the present example will be explained. The speed determination part 14 of the present example has the function of determining the optimum value $v_p$ of the command rotational speed "v" at which the machining time T becomes the smallest, based on the correspondence between the command rotational speed "v" of the spindle A1 and the machining time T calculated by the machining time calculation part 13. The optimum value $v_p$ of the command rotational speed v will be called the "optimum rotational speed $v_p$" below. More specifically, the speed determination part 14 of the present example calculates the command rotational speed "v" which gives the minimal value of the function T(v), using the following formulae (14) and (15) which are obtained by the first order differentiation of the above formulae (12) and (13).

$$T'(v) = \frac{1}{a_{max}} - \frac{D}{v^2} \quad (14)$$

$$T'(v) = \frac{2v}{a_{max} v_b} - \frac{D}{v^2} \quad (15)$$

Here, the following formula (16) is obtained from the above formula (14) in the case where T'(v)=0. The following formula (17) is further derived from the following formula (16).

$$\frac{1}{a_{max}} - \frac{D}{v^2} = 0 \quad (16)$$

$$v = \sqrt{a_{max} D} \quad (17)$$

In the same way, the following formula (18) is obtained from the above formula (15) in the case where T'(v)=0. The following formula (19) is further derived from the following formula (18).

$$\frac{2v}{a_{max} v_b} - \frac{D}{v^2} = 0 \quad (18)$$

$$v = \sqrt[3]{\frac{a_{max} \cdot D \cdot v_b}{2}} \quad (19)$$

Further, assuming that "$v_1$" is the calculated value of the command rotational speed "v" from the above formula (17), the smallest value among the function values T(0), T($v_1$), and T($v_b$) calculated from the above formula (12) becomes the smallest value of the function T(v) in the case where $0 \leq v < v_b$ and $v_1 < v_b$. Meanwhile, the smaller value among the function values T(0) and T($v_b$) calculated from the above formula (12) becomes the smallest value of the function T(v) in the case where $0 \leq v < v_b$ and $v_1 > v_b$.

On the other hand, assuming that "$v_2$" is the calculated value of the command rotational speed "v" from the above formula (19), the smaller value among the function values T($v_b$) and T($v_2$) calculated from the above formula (13) becomes the smallest value of the function T(v) in the case where $v \geq v_b$ and $v > v_b$. The function value T($v_2$) calculated from above formula (13) becomes the smallest value of the function T(v) in the case where $v \geq v_b$ and $v_2 = v_b$, and the function value T($v_b$) calculated from the above formula (13) becomes the smallest value of the function T(v) in the case where $v \geq v_b$ and $v_2 < v_b$. Further, the command rotational speed "v" which gives the smallest value among the function values calculated from the formulae (12) and (13) is determined as the optimum rotational speed $v_p$ of the spindle A1. Note that, the acceleration/deceleration time constant ta which corresponds to the optimum rotational speed $v_p$ of the spindle A1 is expressed by the following formula (20).

$$ta = \frac{v_p}{a(v_p)} \quad (20)$$

Figure 7:
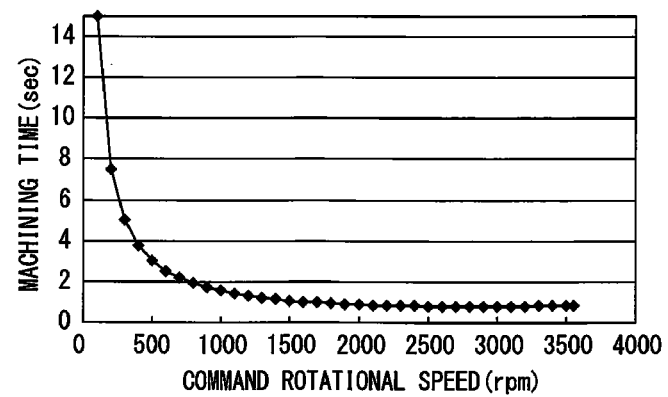
FIG. 7 is a graph which shows a correspondence between a command rotational speed and a machining time of a spindle of a machine tool in FIG. 1.
Figure 8:
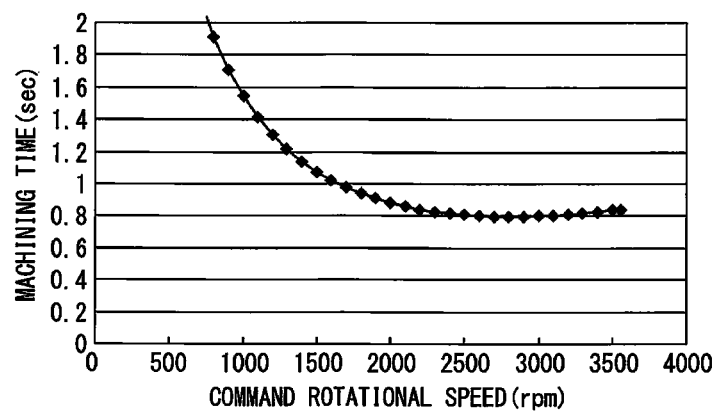
FIG. 8 is a partial enlarged view of a graph of FIG. 7.

Next, the specific calculation results of the machining time T and the optimum rotational speed $v_p$ from predefined rotation amount D and the acceleration/deceleration characteristic of the spindle A1 will be explained. FIG. 7 is a graph which shows the correspondence between the command rotational speed "v" of the spindle A1 and the machining time T when the specific values shown in the following Table 1 are substituted in the above formulae (12) and (13). FIG. 8 is a partial enlarged view of FIG. 7. In the present example, the function a(v) expressed by the above formula (3) is employed as the acceleration/deceleration characteristic of the spindle A1 (see FIG. 5 as well). As will be understood from FIG. 8, the machining time T according to the present example becomes smallest near v=2800 rpm. Further, if the optimum rotational speed $v_p$ is calculated by the above formulae (17) and (19), the calculation result by the formula (17) is 5480 rpm while the calculation result by the formula (19) is 2824 rpm. Here, the range of application of the formula (17) is $0 \leq v < 1500$ rpm, and the range of application of the formula (19) is $v \geq 1500$ rpm, so it is learned that the optimum rotational speed $v_p$ according to the present example is 2824 rpm.

TABLE 1

| | |
|---|---|
| Movement amount "p" per rotation of spindle A1 | 5 mm/rev |
| Movement distance L of spindle A1 | 125 mm |

TABLE 1-continued

| | |
|---|---|
| Rotation amount D of spindle A1 | 125/5 = 25 rev |
| Maximum acceleration $a_{max}$ of spindle A1 | 333.8 rps/sec |
| Base rotation speed $v_b$ of spindle A1 | 1500 rpm |

Next, an outline of the operation of the numerical control device 1 of the present embodiment will be explained with reference to a flow chart. FIG. 9 is a flow chart which shows processing steps of the numerical control device 1 of FIG. 1 for determining the optimum rotational speed $v_p$ of the spindle A1. As shown in FIG. 9, first, at step S901, the acceleration/deceleration characteristic acquisition part 11 acquires the acceleration/deceleration characteristic information I1 of the spindle A1 from the storage part 10. The correspondence between the command rotational speed "v" by the acceleration/deceleration characteristic information I1 acquired at S901 and the maximum acceleration "a" is, for example, expressed by the above formula (3) (see FIG. 5 as well).

Next, at step S902, the rotation amount acquisition part 12 acquires the rotation amount information I2 of the spindle A1 from the storage part 10. Next, at step S903, the machining time calculation part 13 calculates the correspondence between the command rotational speed v and the machining time T, based on the acceleration/deceleration characteristic information I1 acquired at step S901 and the rotation amount information I2 acquired at step S902. For example, the machining time calculation part 13 calculates the correspondence between the command rotational speed "v" and the machining time T, using the above formula (11). Next, at step S904, it calculates the optimum rotational speed $v_p$ of the spindle A1 for minimizing the machining time T, based on the correspondence between the command rotational speed "v" and the machining time T calculated at step S903.

As explained above, according to the numerical control device 1 of the present embodiment, the correspondence between the command rotational speed "v" of the spindle A1 and the machining time T of the tapping process is calculated based on the acceleration/deceleration characteristic information I1 and rotation amount information I2 of the spindle A1 of the machine tool MC, so it becomes possible to determine the optimum rotational speed $v_p$ of the spindle A1 for minimizing the machining time T of the tapping process by the machine tool MC. Note that, in the above explanation, the optimum rotational speed $v_p$ is calculated from only the acceleration/deceleration characteristic information I1 and rotation amount information I2, using the numerical formulae (14) to (19), but the method of determining the optimum rotational speed $v_p$ employed by the numerical control device 1 of the present embodiment is not limited to this. For example, the numerical control device 1 of the present embodiment can acquire a plurality of selection values of the command rotational speed "v" from the user, calculate the machining time T for each of the plurality of selection values using the above numerical formulae (12) and (13), and determine the selection value giving the smallest value of the machining time T, as the optimum rotational speed $v_p$. FIG. 10 is a block diagram which shows the configuration of the numerical control device 1 according to this example.

As shown in FIG. 10, the numerical control device 1 of the present example comprises a command speed acquisition part 15 and acceleration extraction part 16 as well as a storage part 10, acceleration/deceleration characteristic acquisition part 11, rotation amount acquisition part 12, machining time calculation part 13, and speed determination part 14. The command speed acquisition part 15 of the present example has the function of acquiring a plurality of selection values of the command rotational speed "v" serving as candidates of the optimum rotational speed $v_p$ of the spindle A1. More specifically, the command speed acquisition part 15 can acquire a plurality of selection values selected by the user from the numerical control device. However, the command speed acquisition part 15 of the present example can use dedicated software to directly acquire a plurality of selection values from the user. Further, the acceleration extraction part 16 of the present example has the function of acquiring maximum acceleration values corresponding to the plurality of selection values of the command rotational speed "v" from the acceleration/deceleration characteristic information I1. Further, the machining time calculation part 13 of the present example calculates the values of the machining times T corresponding to the plurality of selection values, by substituting the plurality of selection values acquired by the command speed acquisition part 15 and the maximum acceleration values extracted by the acceleration extraction part 16, in the above formulae (12) or (13). Further, the speed determination part 14 of the present example determines the selection value which minimizes the machining time T calculated by the machining time calculation part 13, as the optimum rotational speed $v_p$ of the spindle A1. In this way, according to the numerical control device 1 of the present example, it becomes possible to determine the selection value which minimizes the machining time T among the plurality of selection values of the command rotational speed "v" of the spindle A1, as the optimum value $v_p$.

Next, referring to FIG. 11 and FIG. 12, a numerical control device of a second embodiment of the present invention will be explained. The numerical control device of this embodiment is configured similar to the numerical control device of the above-mentioned first embodiment except for the parts which are specifically explained below. Therefore, the parts which are configured similar to the first embodiment will be assigned the same reference notations as the first embodiment and explanations of parts having the similar configurations will be omitted.

Figure 11:
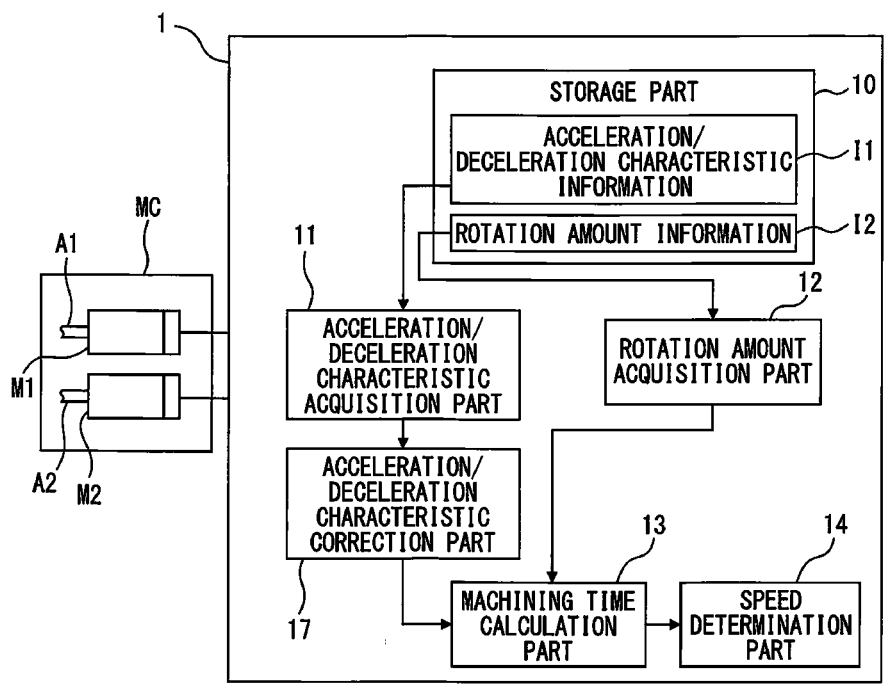
FIG. 11 is a block diagram which shows the configuration of a machining system including a numerical control device of a second embodiment of the present invention.
Figure 12:
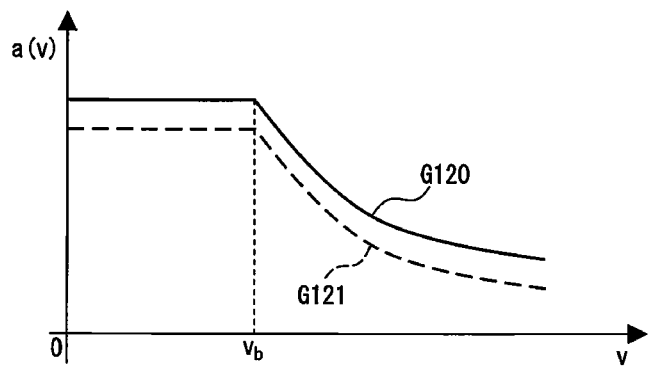
FIG. 12 is a graph which shows a comparison of acceleration/deceleration characteristic information before and after correction by an acceleration/deceleration characteristic correction part of a numerical control device of the present embodiment.

FIG. 11 is a block diagram which shows the configuration of a machining system including an illustrative numerical control device 1 of the present embodiment. As shown in FIG. 11, the numerical control device 1 of the present example comprises an acceleration/deceleration characteristic correction part 17 as well as the above-mentioned storage part 10, acceleration/deceleration characteristic acquisition part 11, rotation amount acquisition part 12, machining time calculation part 13, and speed determination part 14. The numerical control device 1 of the present example may further comprise the above-mentioned command speed acquisition part 15 and acceleration extraction part 16. Further, the acceleration/deceleration characteristic correction part 17 of the present example has the function of correcting the maximum acceleration "a" of the spindle A1 in the acceleration/deceleration characteristic information I1, in light of the drop in torque of the spindle A1 due to the load during the tapping process. FIG. 12 is a graph which shows a comparison of the acceleration/deceleration characteristic information I1 before and after correction by the acceleration/deceleration characteristic correction part 17 of the present example. The solid line graph G120 in FIG. 12 shows the acceleration/deceleration characteristic information I1 before correction by the acceleration/deceleration characteristic correction part 17, while the broken line graph G121 in FIG. 12 shows the acceleration/deceleration characteristic information I1 after correction by the acceleration/deceleration characteristic correction part 17.

The acceleration/deceleration characteristic correction part 17 of the present example calculates the output characteristic of the spindle A1 in light of the drop in torque by dividing the maximum output torque of the spindle A1, exclusive of the cutting torque, by inertia, and corrects the acceleration/deceleration characteristic information I1 based on the calculated output characteristic. Further, the machining time calculation part 13 of the present example calculates the correspondence between the command rotational speed "v" of the spindle A1 and the machining time T, based on the acceleration/deceleration characteristic information I1 after correction by the acceleration/deceleration characteristic correction part 17. In this way, according to the numerical control device 1 of the present embodiment, the correspondence between the command rotational speed "v" of the spindle A1 and the machining time T is calculated based on the acceleration/deceleration characteristic information I1 which has been corrected in light of the drop in torque of the spindle A1 due to the load during the tapping process, and therefore it is possible to accurately determine the optimum rotational speed $v_p$ of the spindle A1 even if the drop in torque of the spindle A1 is relatively large.

Next, referring to FIG. 13 and FIG. 14, the numerical control device of the third embodiment of the present invention will be explained. The numerical control device of the present embodiment is configured similar to the numerical control device of the above-mentioned first embodiment except for the parts which are specifically explained below. Therefore, the parts which are configured similar to the first embodiment will be assigned the same reference notations as the first embodiment and explanations of parts having the similar configurations will be omitted.

Figure 13:
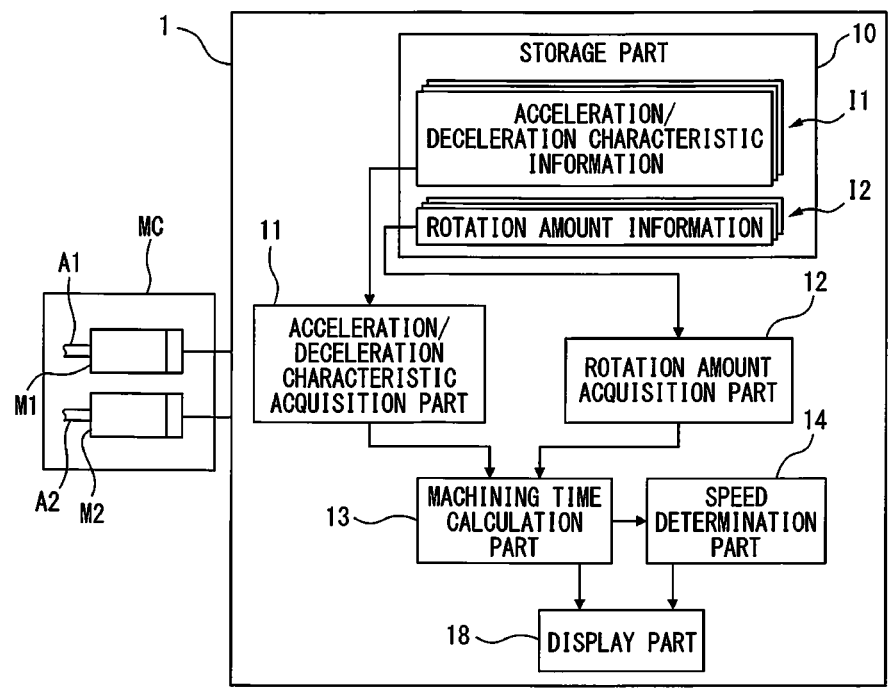
FIG. 13 is a block diagram which shows the configuration of a machining system including a numerical control device of a third embodiment of the present invention.

FIG. 13 is a block diagram which shows the configuration of the machining system including an illustrative numerical control device 1 of the present embodiment. As shown in FIG. 13, the numerical control device 1 of the present example comprises a display part 18 as well as the above-mentioned storage part 10, acceleration/deceleration characteristic acquisition part 11, rotation amount acquisition part 12, machining time calculation part 13, and speed determination part 14. The numerical control device 1 of the present example may further comprise the above-mentioned command speed acquisition part 15 and acceleration extraction part 16, and/or the above-mentioned acceleration/deceleration characteristic correction part 17. The display part 18 of the present example has the function of displaying the correspondence between the command rotational speed "v" and the machining time T of the spindle A1 which has been calculated by the machining time calculation part 13. Further, in the numerical control device 1 of the present example, the rotation amount acquisition part 12 acquires multiple pieces of rotation amount information I2 which show a plurality of rotation amounts D of the spindle A1, and the machining time calculation part 13 calculates the correspondence between the command rotational speed "v" and the machining time T of the spindle A1, based on each of the multiple pieces of rotation amount information I2.

Figure 14:
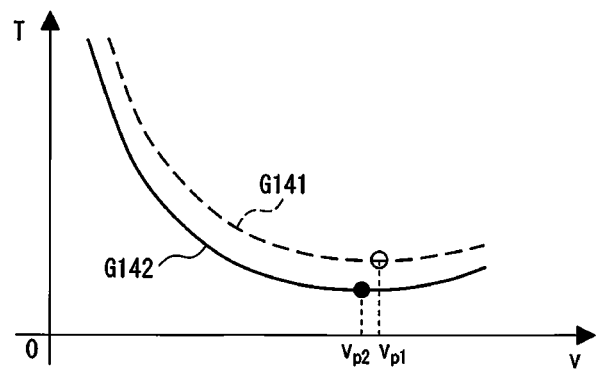
FIG. 14 is a graph displayed by a display part of the numerical control device of the present embodiment, which shows a correspondence between a command rotational speed and a machining time of a spindle.

FIG. 14 is a graph displayed by the display part 18 of the present example, which shows the correspondence between the command rotational speed "v" of the spindle A1 and the machining time T. As shown in FIG. 14, the display part 18 of the present example displays the correspondence between the command rotational speed "v" of the spindle A1 and the machining time T which has been calculated by the machining time calculation part 13 for each of the plurality of rotation amounts D. More specifically, the broken line graph G141 in FIG. 14 shows the correspondence between the command rotational speed "v" and the machining time T which has been calculated based on a certain rotation amount $D_1$, while the solid line graph G142 in FIG. 14 shows the correspondence between the command rotational speed "v" and the machining time T which has been calculated based on another rotation amount $D_2$ which is different from the rotation amount $D_1$. Furthermore, the display part 18 of the present example is configured to highlight the points where the machining times T becomes smallest in the graphs G141 and G142 and to display the results of calculating the optimum rotational speeds $v_{p1}$ and $v_{p2}$ based on the plurality of rotation amounts $D_1$ and $D_2$.

Further, in the numerical control device 1 of the present example, the acceleration/deceleration characteristic acquisition part 11 acquires the acceleration/deceleration characteristic information I1 predefined for each of plural spindles, while the machining time calculation part 13 can calculate the correspondence between the command rotational speed "v" of the spindle A1 and the machining time T, based on each of the plural pieces of acceleration/deceleration characteristic information I1. Due to this, the correspondence between the command rotational speed "v" of the spindle A1 and the machining time T can be displayed for each of the plural spindles, so it is possible to visually confirm the machining time T for each of plural machine tools.

Effect of Invention

According to the first aspect of the present invention, the correspondence between the command rotational speed of the spindle and the machining time of the tapping process is calculated based on the acceleration/deceleration characteristic information and rotation amount of the spindle of the machine tool, so it is possible to determine the command rotational speed of the spindle which minimizes the machining time of the tapping process by the machine tool, as the optimum value.

According to the second aspect of the present invention, it is possible to determine the selection value among the plurality of selections values of the command rotational speed of the spindle which minimizes the machining time, as the optimum value.

According to the third aspect of the present invention, it is possible to easily calculate the correspondence between the command rotational speed and the machining time of the spindle.

According to the fourth aspect of the present invention, the correspondence between the command rotational speed and the machining time of the spindle is calculated based on the acceleration/deceleration characteristic information which has been corrected in light of the drop in torque of the spindle caused by the load during the tapping process, so it is possible to accurately determine the command rotational speed of the spindle which minimizes the machining time even if the drop in torque of the spindle is relatively large.

According to the fifth aspect of the present invention, the correspondence between the command rotational speed and the machining time of the spindle is displayed, so it is possible to visually confirm the correspondence between the command rotational speed and the machining time of the spindle.

According to the sixth aspect of the present invention, the correspondence between the command rotational speed and the machining time of the spindle is displayed for each of a plurality of rotation amounts, so it is possible to visually confirm how the machining time varies according to different rotation amounts.

According to the seventh aspect of the present invention, the correspondence between the command rotational speed and the machining time of the spindle is displayed for each of plural spindles, so it is possible to visually confirm the machining time for each of the plural spindles.

The present invention is not limited to only the above embodiments and can be modified in various ways in the range described in the claims. Further, the dimensions, shapes, materials, etc. of the above-mentioned parts are only examples. Various dimensions, shapes, materials, etc. can be employed for achieving the effects of the present invention.

The invention claimed is:

1. A numerical control device of a machine tool which is configured to perform tapping process on a workpiece, using a spindle to which a tapping tool is attached, and a feed shaft for feed operation of said spindle, the numerical control device comprising a controller configured to:
acquire predetermined acceleration/deceleration characteristic information showing
a correspondence between
(a) a command rotational speed of the spindle and
(b) a maximum acceleration of the spindle,
acquire predetermined rotation amount information which shows the rotation amount of the spindle for a period from when the feed operation of the spindle is started to when the tapping tool reaches a bottom of the hole of the workpiece,
calculate a correspondence between the command rotational speed of the spindle and a machining time required for the spindle to reach the rotation amount, based on
(a) the acceleration/deceleration characteristic information, and
(b) the rotation amount information, and
determine an optimum value of the command rotational speed of the spindle for minimizing the machining time, based on the calculated correspondence between the command rotational speed of the spindle and a machining time required for the spindle to reach the rotation amount, and
control the spindle to rotate at the determined optimum value of the command rotational speed.

2. The numerical control device according to claim 1, wherein the controller is further configured to:
acquire a plurality of selection values of the command rotational speed of the spindle,
calculate a correspondence between each of the plurality of selection values and the machining time, and
determine the optimum value of the command rotational speed of the spindle from the plurality of selection values.

3. The numerical control device according to claim 1, wherein the controller is configured to calculate the correspondence between the command rotational speed of the spindle and the machining time using the following formula (1):

$$T(v) = \frac{v}{a(v)} + \frac{D}{v} \qquad (1)$$

where:
"v" is the command rotational speed of the spindle,
"a(v)" is the maximum acceleration,
"D" is the rotation amount, and
"T(v)" is the machining time.

4. The numerical control device according to claim 1, wherein the controller is further configured to:
correct the maximum acceleration in the acceleration/deceleration characteristic information in response to a drop in torque of the spindle caused by a load during the tapping process, and
calculate the correspondence between the command rotational speed of the spindle and the machining time, based on the corrected acceleration/deceleration characteristic information.

5. The numerical control device according to claim 1, further comprising:
a display configured to display the calculated correspondence between the command rotational speed of the spindle and the machining time.

6. The numerical control device according to claim 5, wherein
the controller is configured to:
acquire plural pieces of rotation amount information which show a plurality of the rotation amounts, and
calculate the correspondence between the command rotational speed of the spindle and the machining time, based on each of the plural pieces of rotation amount information, and
the display is configured to display the calculated correspondence between the command rotational speed of the spindle and the machining time for each of the plurality of rotation amounts.

7. The numerical control device according to claim 5, wherein
the controller is configured to:
acquire plural pieces of the acceleration/deceleration characteristic information defined for plural spindles,
calculate a correspondence between the command rotational speed of a spindle and the machining time, based on each of the plural pieces of acceleration/deceleration characteristic information, and
the display is configured to display the calculated correspondence between the command rotational speed of the spindle and the machining time for each of the plural spindles.

* * * * *